(12) United States Patent
Hsu et al.

(10) Patent No.: US 10,664,021 B1
(45) Date of Patent: May 26, 2020

(54) FOLDABLE DISPLAY DEVICE AND A HINGE MECHANISM

(71) Applicant: FOSITEK CORPORATION, New Taipei (TW)

(72) Inventors: An-Szu Hsu, New Taipei (TW); Way-Han Dai, New Taipei (TW); Shao-Chun Chao, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 16/570,053

(22) Filed: Sep. 13, 2019

(30) Foreign Application Priority Data

Jun. 25, 2019 (TW) .............................. 108122115 A

(51) Int. Cl.
*G06F 1/16* (2006.01)
*E05D 3/12* (2006.01)
*E05D 11/10* (2006.01)
*H04B 1/3827* (2015.01)

(52) U.S. Cl.
CPC ........... *G06F 1/1681* (2013.01); *E05D 3/122* (2013.01); *E05D 11/1028* (2013.01); *G06F 1/1626* (2013.01); *G06F 1/1652* (2013.01); *E05Y 2900/606* (2013.01); *H04B 1/3827* (2013.01)

(58) Field of Classification Search
CPC .............................. G06F 1/1652; G06F 1/1681
See application file for complete search history.

(56) References Cited

U.S. PATENT DOCUMENTS

| 9,870,031 | B2 * | 1/2018 | Hsu ........................ G06F 1/1681 |
| 9,874,048 | B1 * | 1/2018 | Hsu ..................... E05D 11/1028 |
| 10,001,815 | B1 * | 6/2018 | Yao ........................ G06F 1/1652 |
| 10,423,019 | B1 * | 9/2019 | Song .................. H04M 1/0268 |
| 2012/0304419 | A1 * | 12/2012 | Mai ......................... E05D 11/06 16/374 |
| 2012/0307423 | A1 * | 12/2012 | Bohn ...................... G06F 1/1641 361/679.01 |
| 2013/0002114 | A1 * | 1/2013 | Hamers ................. G06F 1/1616 312/319.5 |
| 2015/0173218 | A1 * | 6/2015 | Hsu ........................... E05D 3/12 16/366 |
| 2015/0241925 | A1 * | 8/2015 | Seo ....................... G06F 1/1652 361/679.27 |
| 2016/0062412 | A1 * | 3/2016 | Park ...................... G06F 1/1616 361/679.27 |
| 2018/0196469 | A1 * | 7/2018 | Yamauchi ............. G06F 1/1616 |

* cited by examiner

Primary Examiner — Adrian S Wilson
(74) Attorney, Agent, or Firm — Birch, Stewart, Kolasch & Birch, LLP

(57) ABSTRACT

A hinge mechanism connectable with two housing shells for a flexible display to be attached thereto includes a base seat, a torque transmitting unit and two rotary members. The base seat defines therein a rail region and two mounting regions. Each mounting region is defined by an arcuate bottom wall and first and second ribs. The torque transmitting unit includes two transmitting shafts and a synchronously driving member. The rotary members are disposed at the mounting regions to be pivoted about the transmitting shafts so as to bring the housing shells into unfolded and folded states.

10 Claims, 20 Drawing Sheets

FOLDABLE DISPLAY DEVICE AND A HINGE MECHANISM

CROSS-REFERENCE TO RELATED APPLICATION

This application claims priority of Taiwanese Patent Application No. 108122115, filed on Jun. 25, 2019.

FIELD

The disclosure relates to a foldable display device, and more particularly to a foldable display device with a hinge mechanism, and such hinge mechanism.

BACKGROUND

With the evolution of market trends, display screens of handheld electronic devices such as smart phones and tablets have been improved toward high resolution and large dimension for consumers to get better viewing and handling for enjoying films or mobile games. The increased dimensioned body also results in inconvenience of carrying. Therefore, flexible display screens have gradually attracted the attention of mobile phone manufacturers. From home TV, computer display screens to smart phones, tablets and other applications, foldable smart phones, tablets, etc. have been developed to achieve the effect of large-size displaying and easy carrying. In order to withstand repeated display folding and unfolding, it is desirable to develop a foldable display device with hinge mechanisms which can support a flexible display screen and allow smooth and stable folding and unfolding of the same.

SUMMARY

Therefore, an object of the disclosure is to provide a foldable display device with a hinge mechanism that can support a flexible display screen and allow smooth and stable folding and unfolding of the same.

According to an aspect of the disclosure, a hinge mechanism is connectable with two housing shells for a flexible display to be attached thereto. The hinge mechanism includes a base seat, a torque transmitting unit and two rotary members. The base seat has a first bottom wall which extends in a left-right direction to terminate at two first wall ends, two first ribs which respectively extend from the first wall ends in an up-down direction so as to cooperatively define a rail region thereamong, two arcuate second bottom walls which respectively extend from the first wall ends in the left-right direction to respectively terminate at two second wall ends, and two second ribs which respectively extend from the second wall ends in the up-down direction. Each of the second bottom walls has an upper wall surface which is curved and which cooperates with adjacent ones of the first and second ribs to define a mounting region thereamong. The torque transmitting unit includes a transmitting base, two transmitting shafts and a synchronously driving member. The transmitting base is disposed over the base frame, and has two mounting portions each of which extends in the left-right direction and which are disposed opposite to each other in a front-rear direction. Each of the mounting portions has a shaft accommodating groove which is formed in a lower wall thereof and opened downwardly, and which is elongated in the left-right direction, and an anchoring protrusion which is disposed in and projects from one end of the shaft accommodating groove. The transmitting shafts are respectively disposed in the shaft accommodating grooves of the mounting portions. Each of the transmitting shafts has a pivot end which is pivotably engaged with the anchoring protrusion to permit rotation of the transmitting shaft relative to the transmitting base, a toothed end opposite to the pivot end in the left-right direction, and a middle spirally grooved portion which is interposed between the pivot and toothed ends and formed with a spiral groove. The synchronously driving member is disposed at the rail region, and has two arcuate engaging portions which are respectively engaged with the spirally grooved portions of the transmitting shafts and which respectively have engaging protrusions that are respectively and fittingly engaged in and movable along the spiral grooves to allow rotation of the transmitting shafts relative to the synchronously driving member, and a transiting portion which is interposed between the arcuate engaging portions and which is movably disposed at the rail region in the left-right direction so as to make synchronous rotations of the transmitting shafts in opposite rotational directions. The rotary members are respectively disposed at the mounting regions. Each of the rotary members has an arcuate rack portion which is sleeved on and meshes with the toothed end of the respective transmitting shaft to allow the rotation of the transmitting shaft when the arcuate rack portion is pivoted about the transmitting shaft, and a plate connecting portion which extends laterally and in the front-rear direction from the arcuate rack portion and which is connectable with a respective one of the housing shells such that the rotary members are rotatable relative to the base seat by at least 90 degrees between an unfolded position, where the plate connecting portions extend parallel to each other and lie on a horizontal plane, and a folded position, where the plate connecting portions are placed close to each other.

According to another aspect of the disclosure, a foldable display device for a flexible display to be attached thereto includes two housing shells and a plurality of the hinge mechanisms. Each housing shell includes a shell body and a supporting plate which covers the shell body. The supporting plates of the housing shells cooperatively define a support surface for the flexible display to be attached thereto. The hinge mechanisms are disposed and spaced apart from each other in the left-right direction. The plate connecting portions of the rotary members of each hinge mechanism are respectively connected with the supporting plates of the housing shells.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
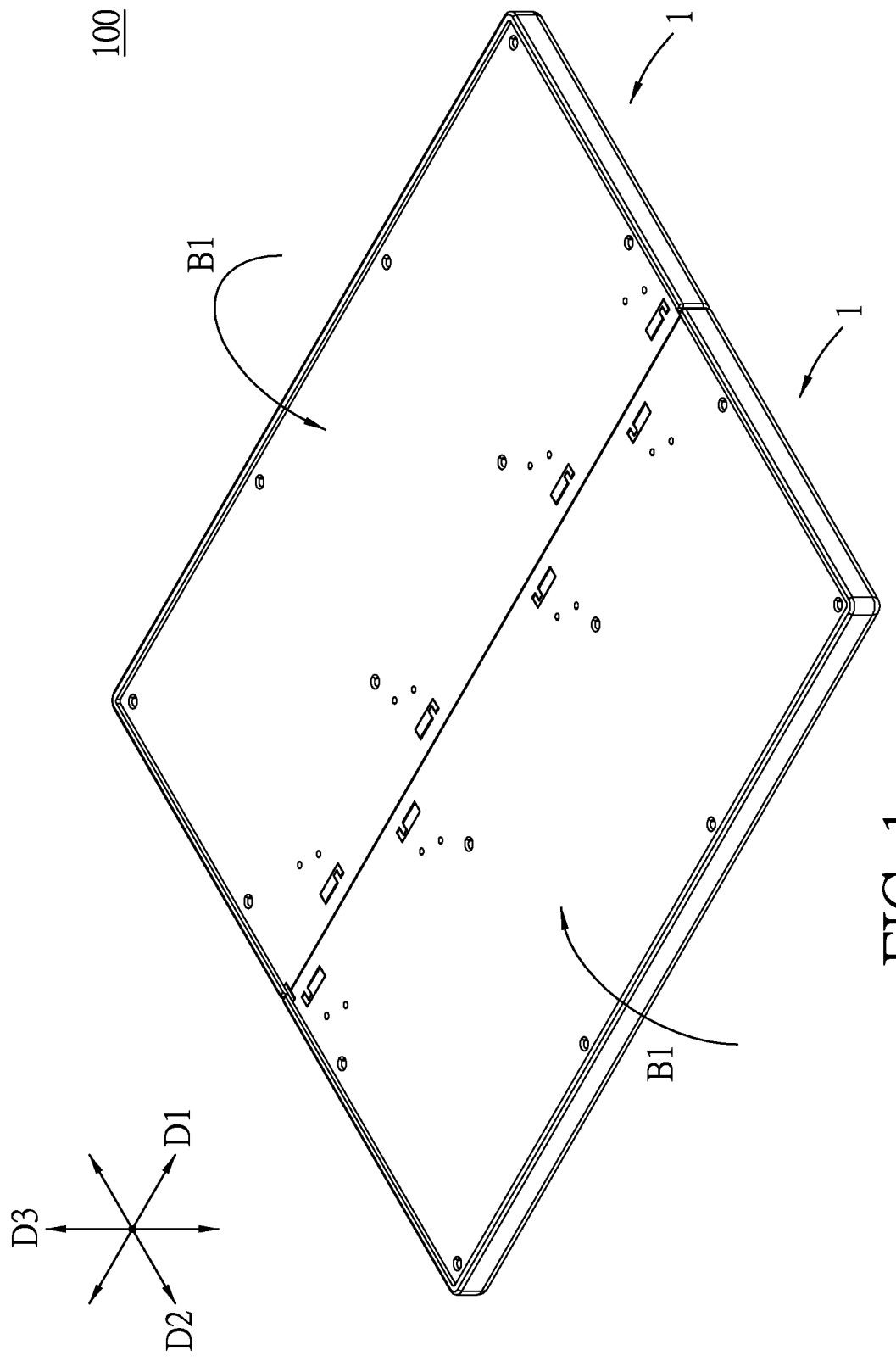
FIG. 1 is a perspective view illustrating an embodiment of a foldable display device according to the disclosure in an unfolded state.
Figure 2:
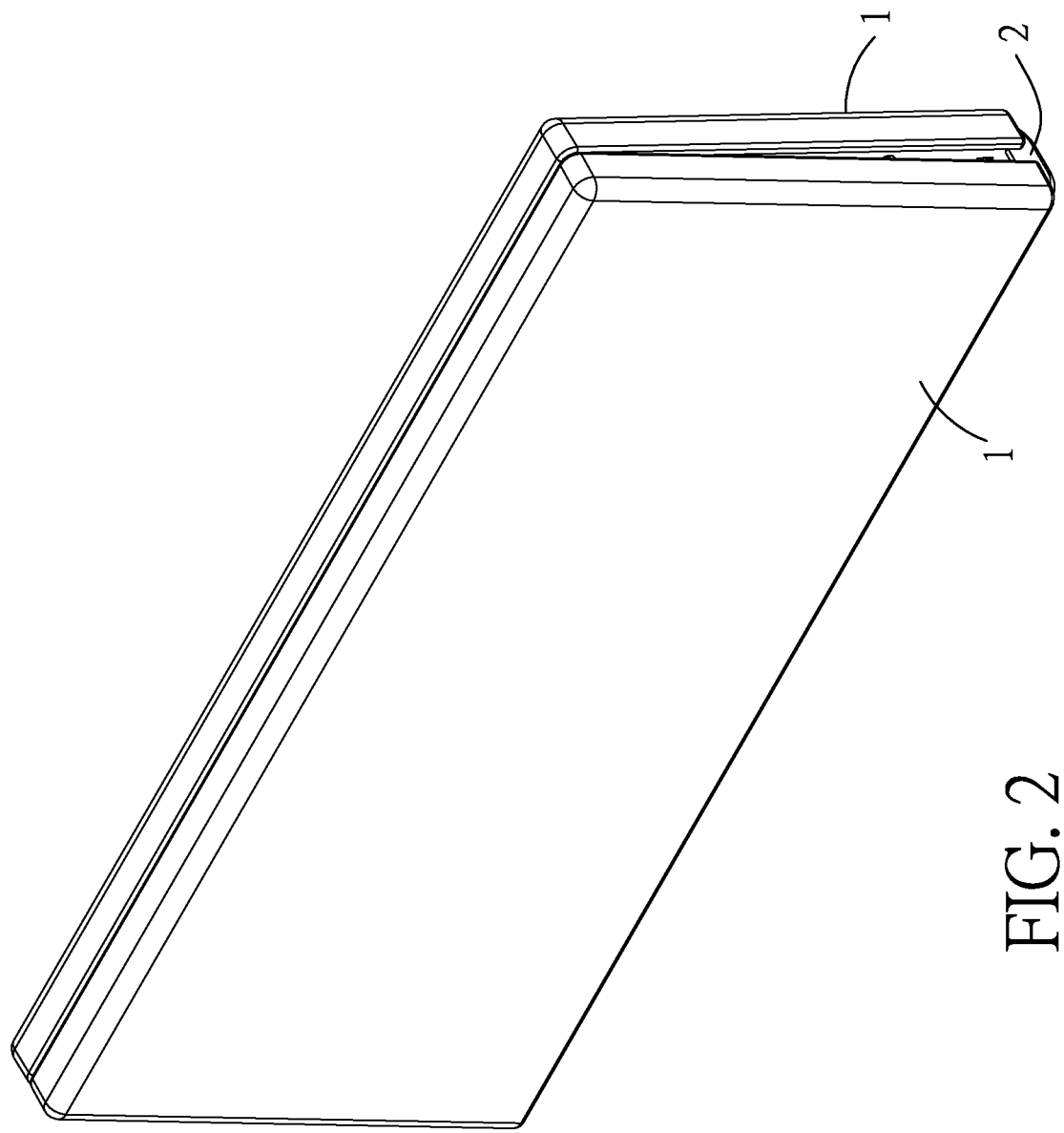
FIG. 2 is a perspective view of the embodiment in a folded state.

Referring to FIGS. 1 and 2, an embodiment of a foldable display device 100 according to the disclosure is adapted to support a flexible display (not shown), and is foldable inwardly in folded directions (B1) for folding the flexible display.

Figure 3:
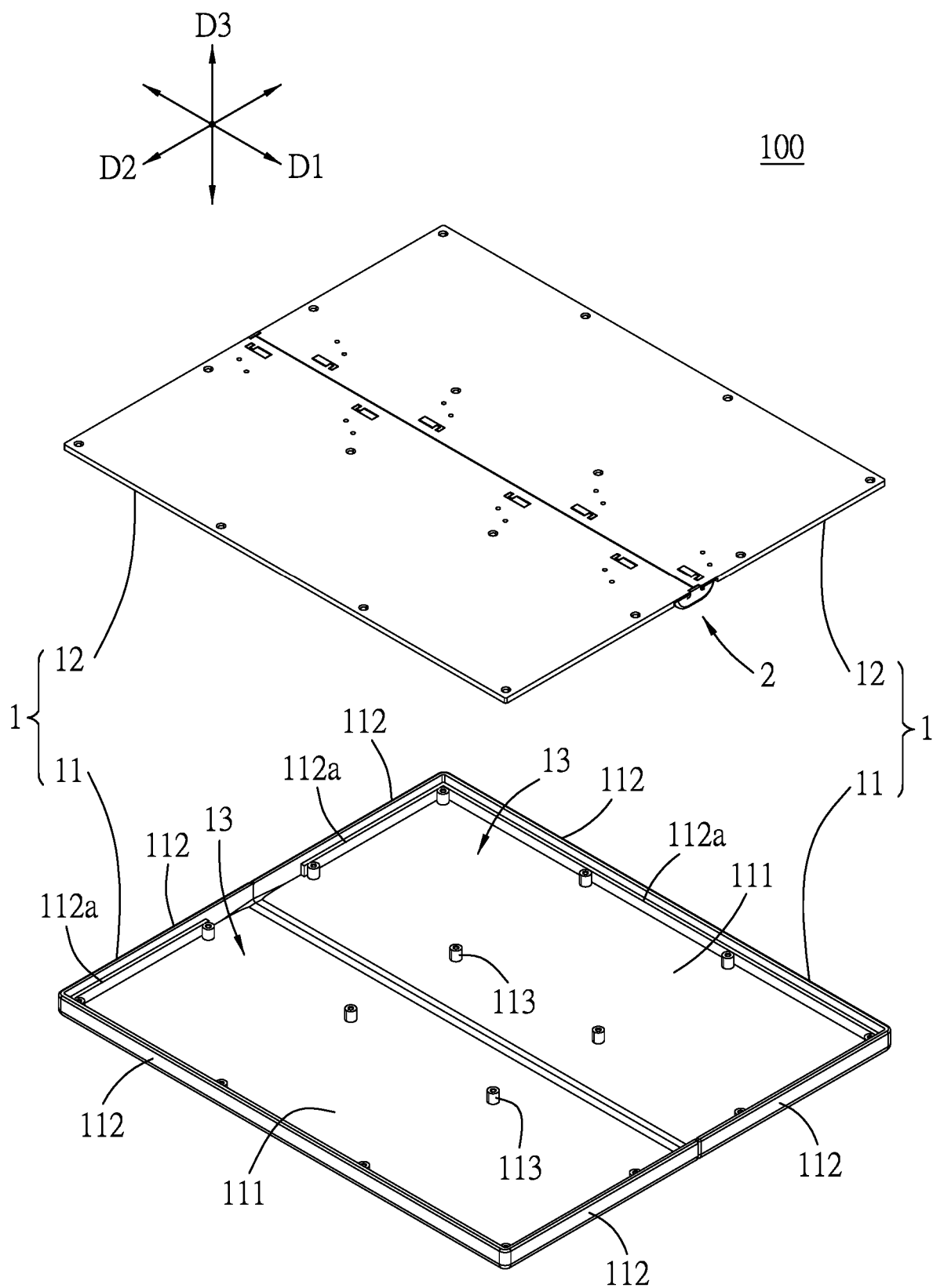
FIG. 3 is an exploded perspective view of the embodiment.
Figure 4:
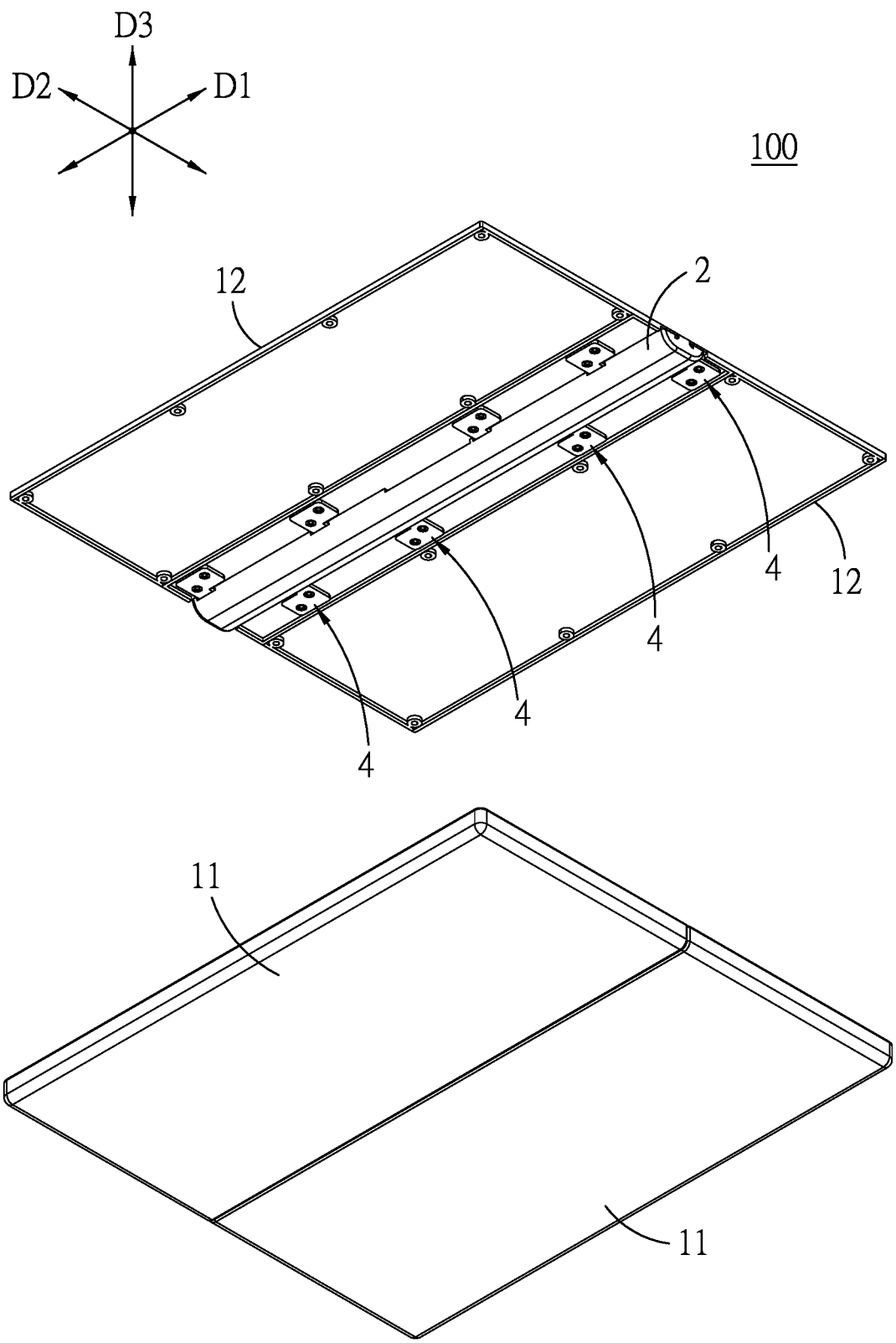
FIG. 4 is an exploded perspective view of the embodiment taken from another angle.
Figure 5:
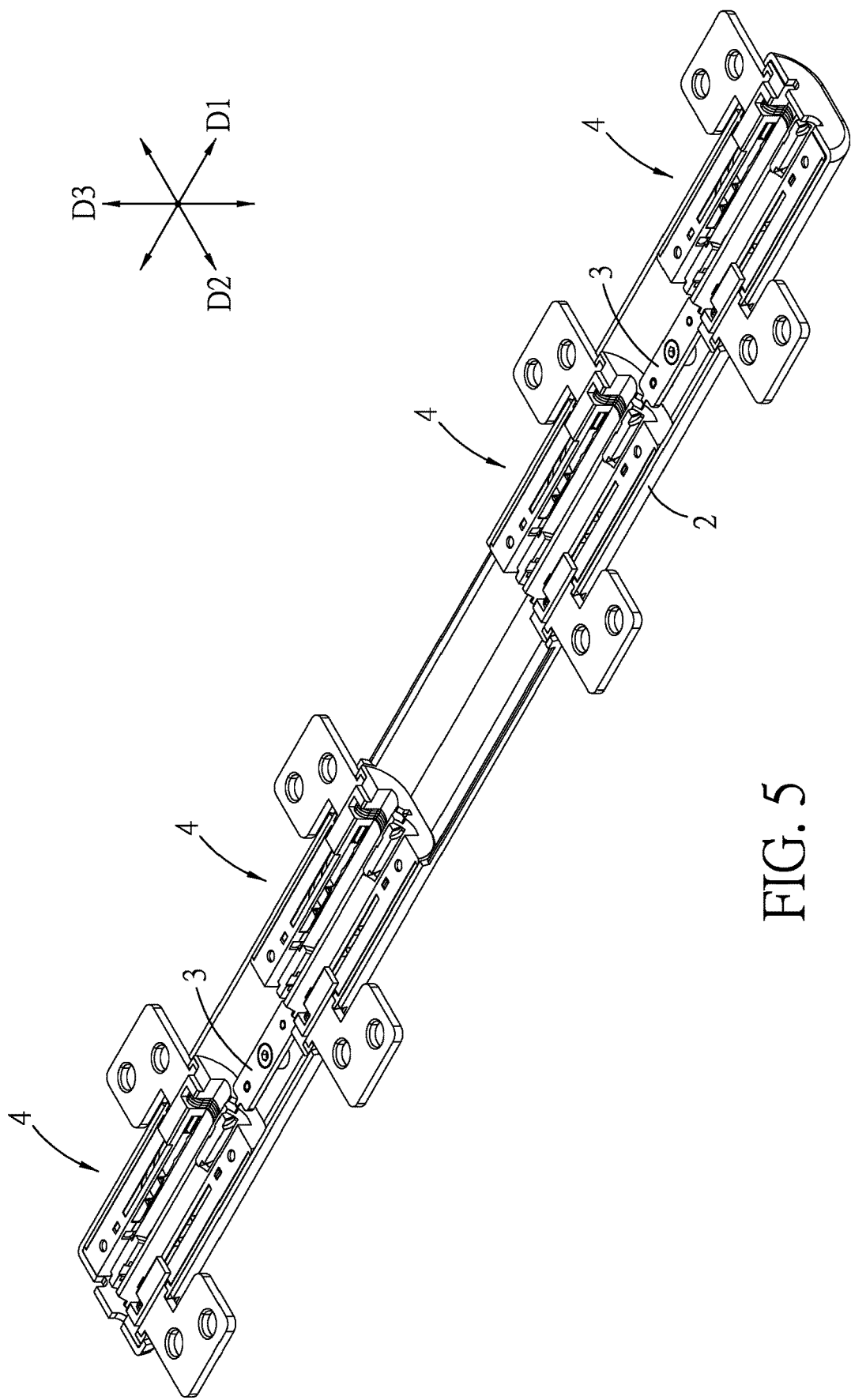
FIG. 5 is a perspective view of a plurality of hinge mechanisms of the embodiment mounted on a cover shell.

Referring to FIGS. 3 to 5, the embodiment of the foldable display device 100 includes two housing shells 1, an elongated cover shell 2 and a plurality of hinge mechanisms 4. Each housing shell 1 includes a shell body 11 and a supporting plate 12 which covers the shell body 11. The shell body 11 has a main base plate 111, three rim plates 112 extending from a periphery of the main base plate 111, and a plurality of positioning studs 113 disposed on the main base plate 111. Three supporting flanges (112a) are respectively formed on inner surfaces of the rim plates 112. Each supporting plate 12 is supported on the supporting flanges (112a) and the positioning studs 113 so as to cooperate with the main base plate 111 to define amounting space 13, and is secured to the positioning studs 113 by means of fasteners (not shown). Upper major surfaces of the supporting plates 12 cooperatively define a support surface for the flexible display to be attached thereto. The cover shell 2 is disposed between the housing shells 1 and extends in a left-right direction (D1) for supporting the hinge mechanisms 4 thereon such that the hinge mechanisms 4 are disposed and spaced apart from one another in the left-right direction (D1). When the housing shells 1 are unfolded to a horizontal unfolded state, as shown in FIGS. 1, 3 and 4, the cover shell 2 is concealed in the mounting space 13 by the housing shells 1. When the housing shells 1 are folded to an upright folded state, as shown in FIG. 2, the cover shell 2 is exposed outwardly of the housing shells 1.

Referring again to FIGS. 3 to 5, the hinge mechanisms 4 are arranged in the left-right direction (D1) and received in the mounting space 13 to be connected with undersides of the supporting plates 12. The foldable display device 100 further includes a plurality of connecting bars 3, each of which interconnects two adjacent ones of the hinge mechanisms 4 and is secured to the cover shell 2. In this embodiment, the foldable display device 100 has four of the hinge mechanisms 4 and two of the connecting bars 3.

Figure 6:
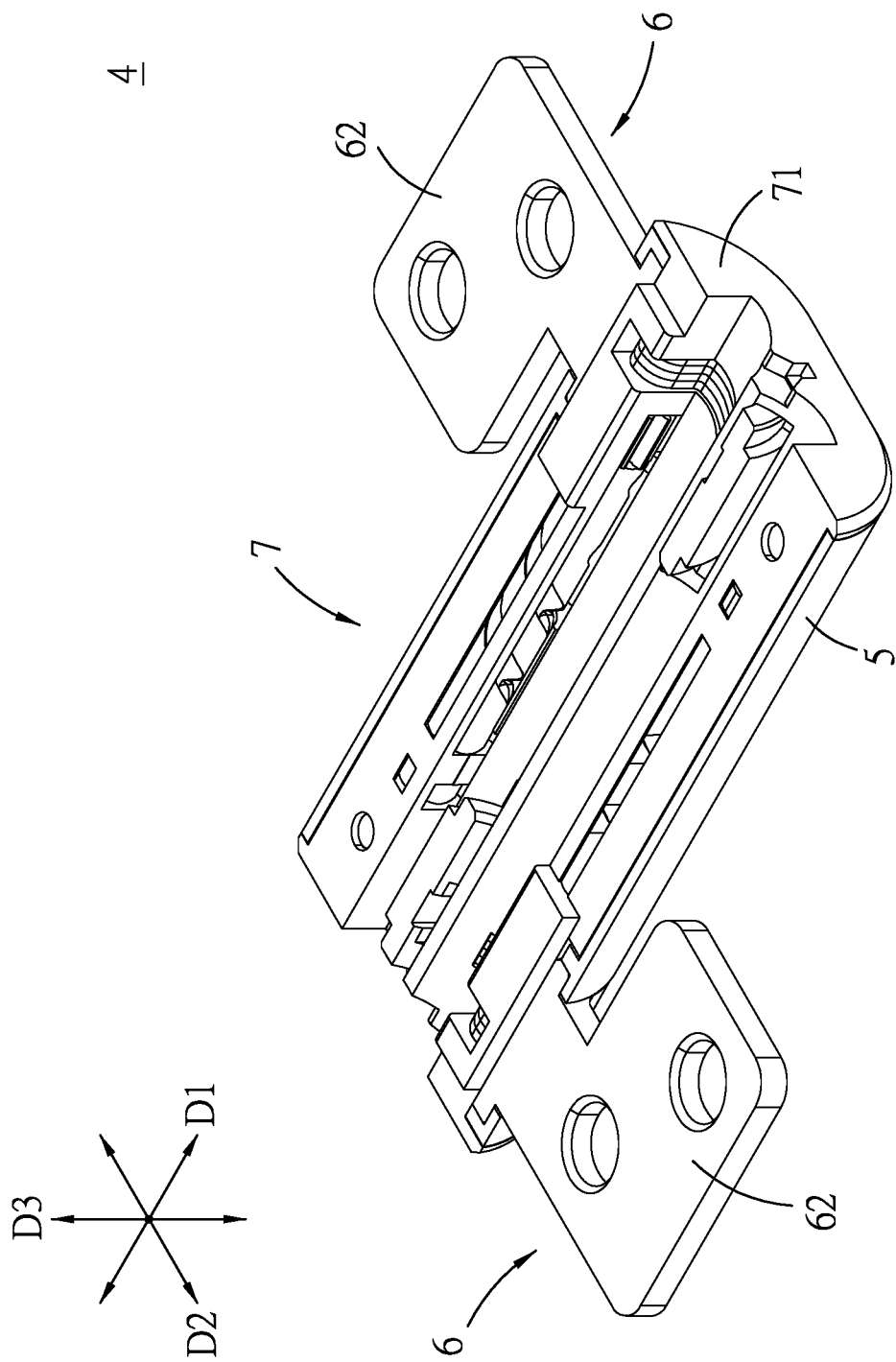
FIG. 6 is a perspective view of a hinge mechanism of the embodiment, two rotary members of which are in an unfolded position.
Figure 7:
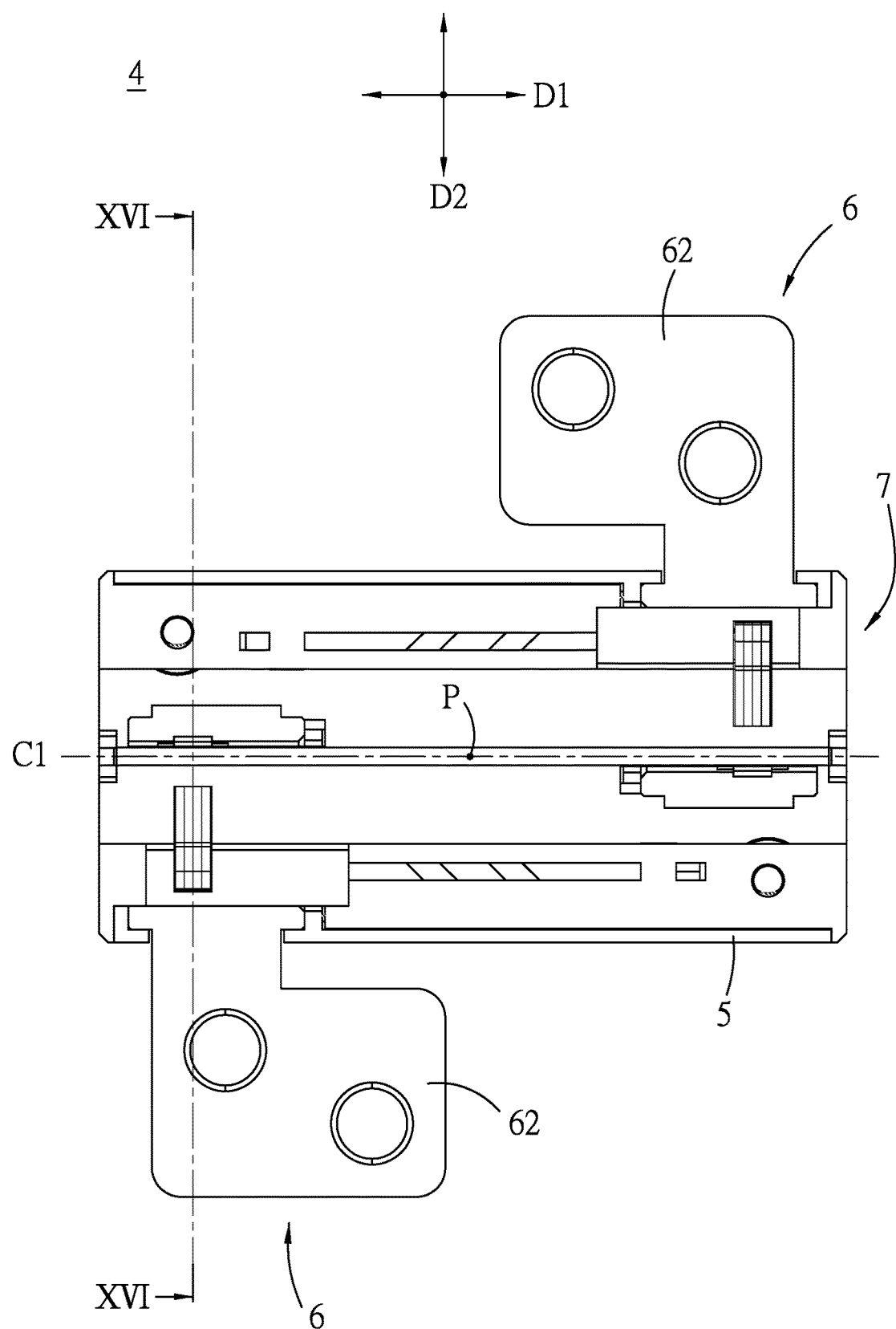
FIG. 7 is a top view of FIG. 6.
Figure 8:
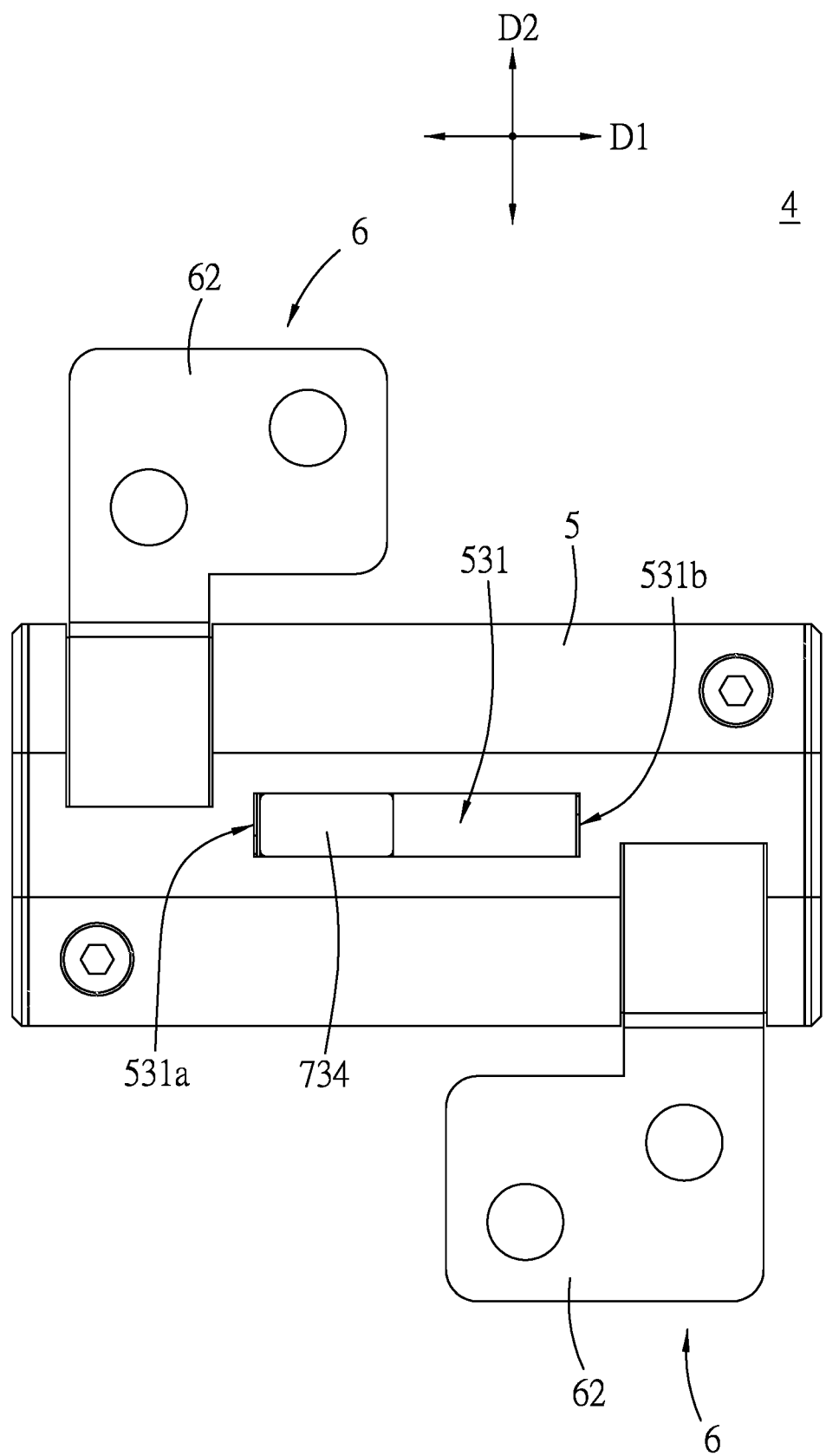
FIG. 8 is a bottom view of FIG. 6.

Referring to FIGS. 6 to 8, in this embodiment, each hinge mechanism 4 has a rotary center (P) at a structural center thereof, and a central line (Cl) which extends in the left-right direction (D1) and passes through the rotary center (P) to define upper and lower halves of the hinge mechanism 4. The upper and lower halves are symmetrical in terms of the rotary center (P).

Figure 9:
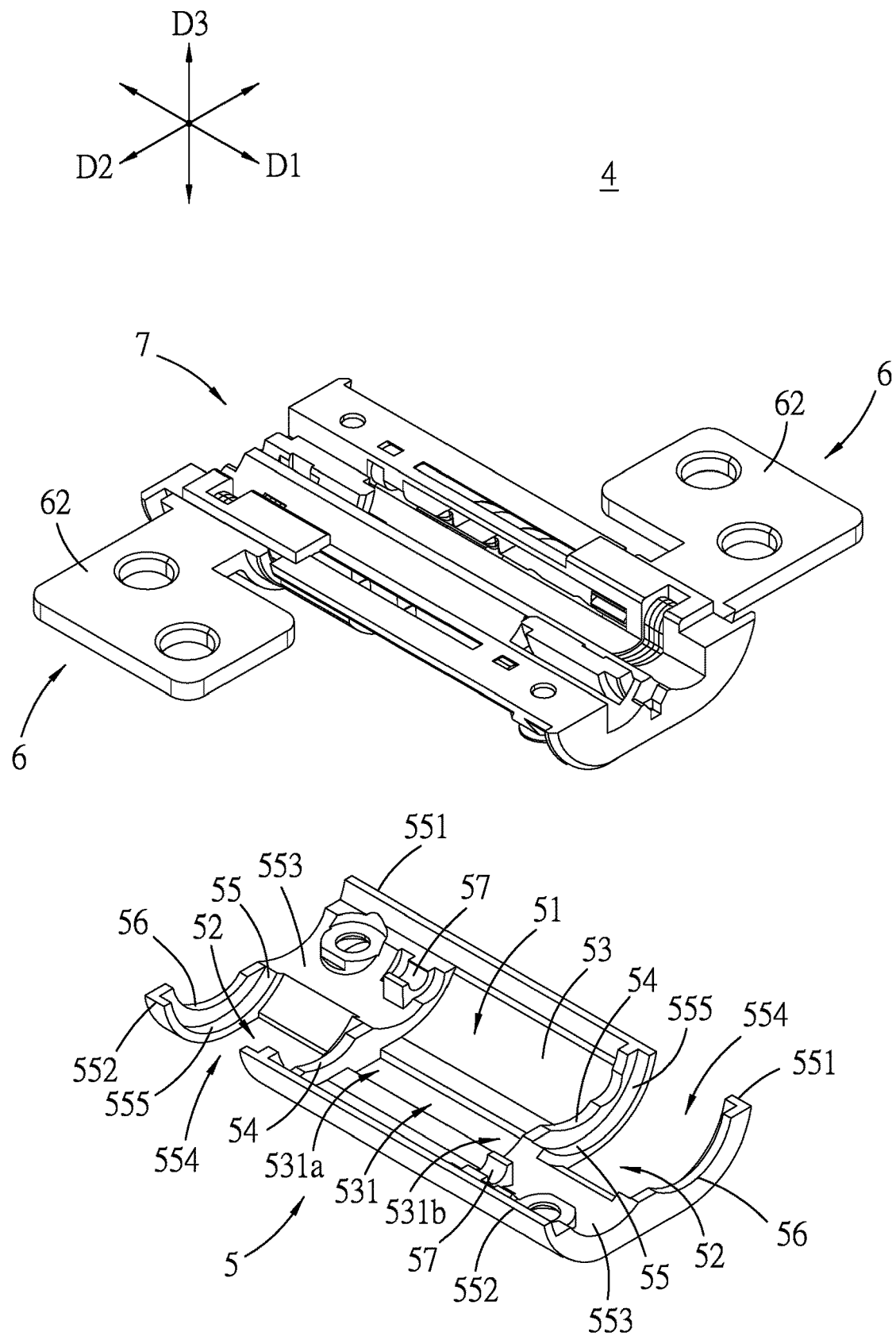
FIG. 9 is an exploded perspective view of the hinge mechanism.
Figure 10:
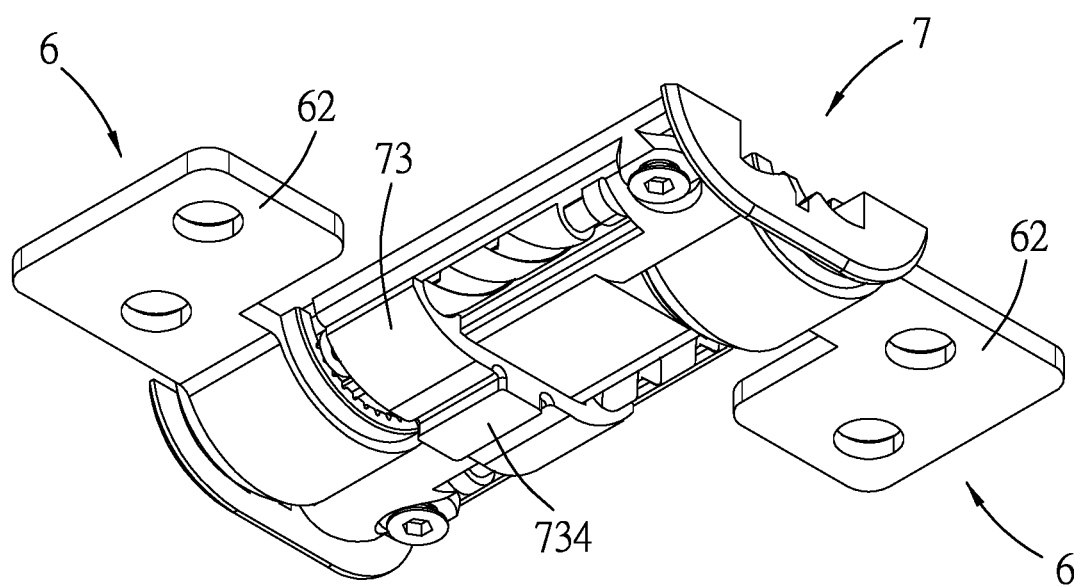
FIG. 10 is an exploded perspective view similar to FIG. 9 but taken from another angle.
Figure 10:
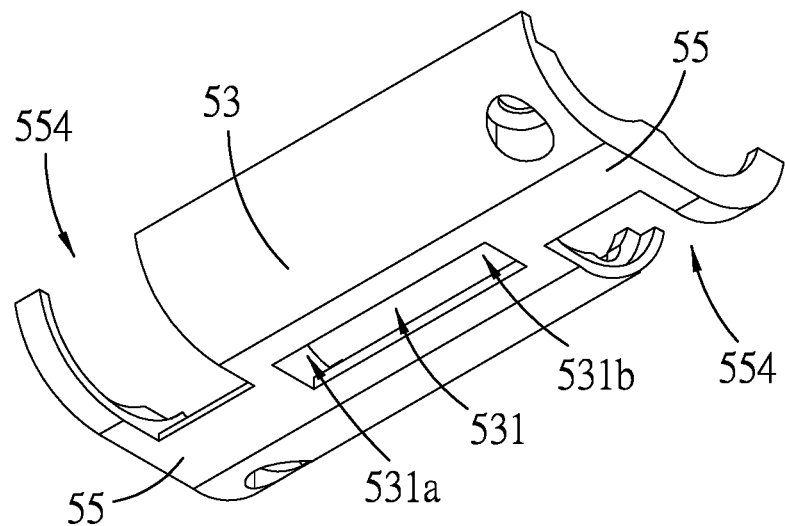

Referring to FIGS. 9 and 10, each hinge mechanism 4 includes a base seat 5, two rotary members 6 and a torque transmitting unit 7. The base seat 5 has a first bottom wall 53 which extends in the left-right direction (D1) to terminate at two first wall ends, two first ribs 54 which respectively and integrally extend from the first wall ends in an up-down direction (D3) so as to cooperatively define a rail region 51 thereamong, two second bottom walls 55 which respectively and integrally extend from the first wall ends in the left-right direction (D1) to respectively terminate at two second wall ends, and two second ribs 56 which respectively and integrally extend from the second wall ends in the up-down direction (D3). Each of the second bottom walls 55 has an upper wall surface 553 which is curved and which cooperates with adjacent ones of the first and second ribs 54, 56 to define a mounting region 52 thereamong. The first bottom wall 53 has a grooved rail 531 formed at a center of the rail region 51 and extending in the left-right direction (D1) to the first ribs 54 to terminate at first and second rail ends (531a, 531b). Each of the second bottom walls 55 has front and rear side wall portions 551, 552 opposite to each other in a front-rear direction (D2). The upper wall surface 553 of each second bottom wall 55 has two arcuate supporting surface portions 555 which are spaced apart from each other in the left-right direction (D1) by a notched slot 554 that extends through the second bottom wall 55. In this embodiment, one notched slot 554 is opened at the corresponding front side wall portion 551, and the other notched slot 554 is opened at the corresponding rear side wall portion 552. The base seat 5 also has two anchoring halves 57 respectively disposed on the upper wall surfaces 553 of the second bottom walls 55.

Figure 11:
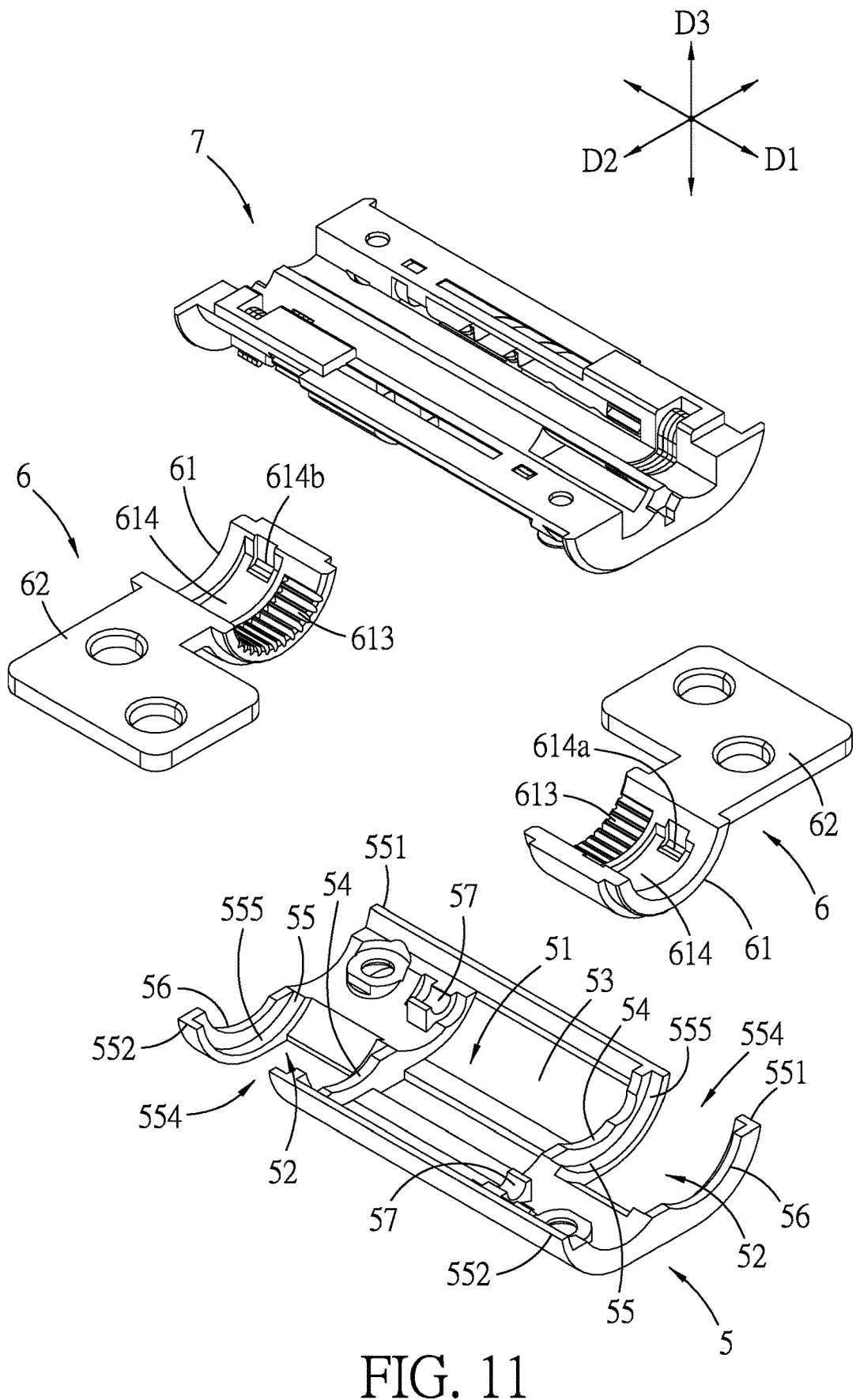
FIG. 11 is an exploded perspective view of the hinge mechanism.
Figure 12:
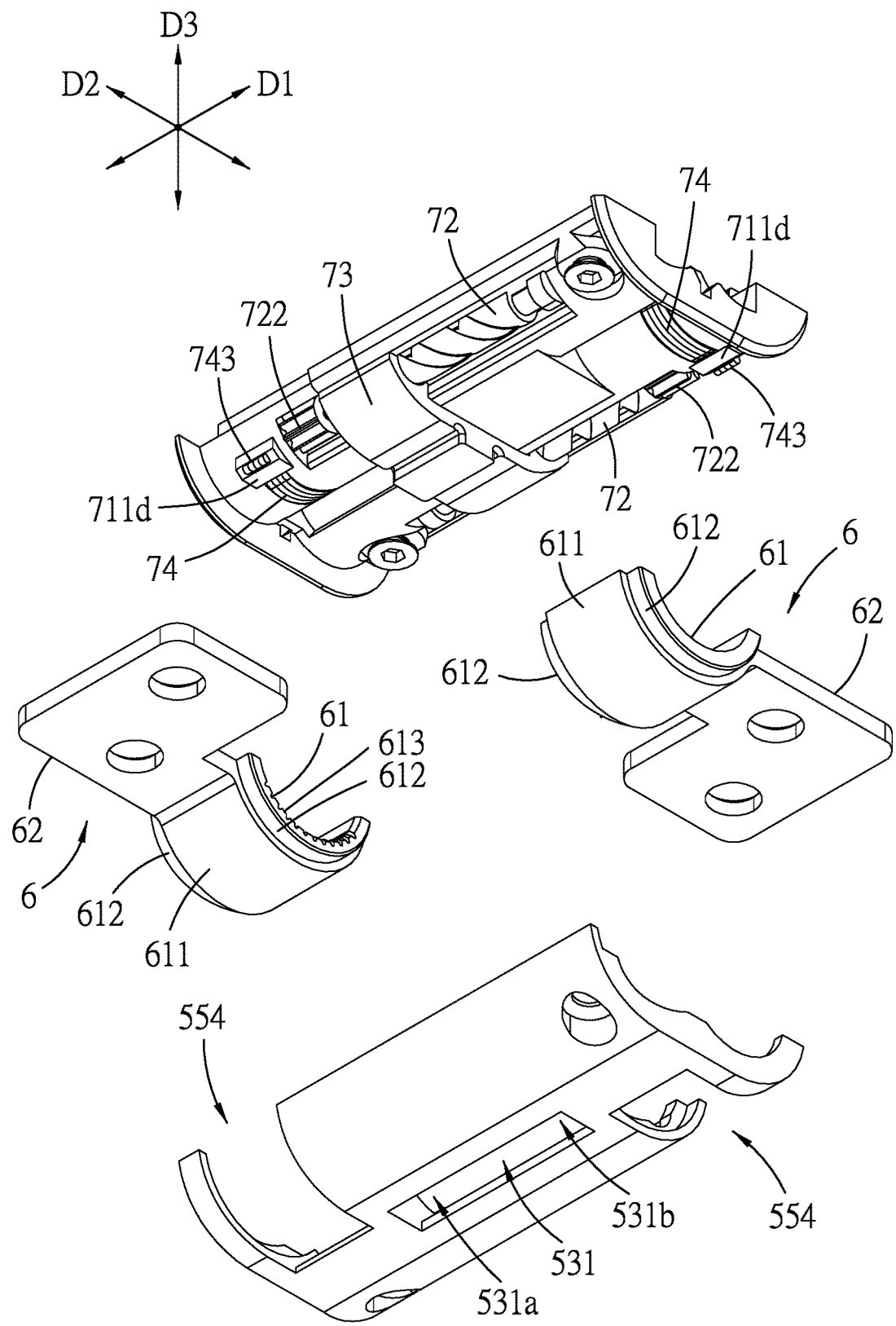
FIG. 12 is an exploded perspective view similar to FIG. 11 but taken from another angle.

Referring to FIGS. 11 and 12, the rotary members 6 are respectively disposed at the mounting regions 52. Each rotary member 6 has an arcuate plate mounting portion 61 and a flat plate connecting portion 62 which extends laterally from a side of the arcuate plate mounting portion 61. The arcuate plate mounting portion 61 is disposed on the corresponding second bottom wall 55, and has two arcuate sliding wall portions 612 which face downward and are respectively and fittingly slidable on the arcuate supporting surface portions 555, an arcuate cover wall portion 611 which interconnects the arcuate sliding wall portions 612 to cover the notched slot 554, an arcuate rack portion 613 which faces upward, and an arcuate concaved portion 614 which is adjoined to the arcuate rack portion 613 in the left-right direction (D1) and has first and second retaining ends (614a, 614b) opposite to each other in the front-rear direction (D2). Thus, each rotary member 6 is rotatable stably and smoothly relative to the base seat 5. In an alternative embodiment, the notched slots 554 may be dispensed with. The plate connecting portions 62 of the rotary members 6 are respectively connected with lower surfaces of the supporting plates 12 (see FIG. 4).

Figure 13:
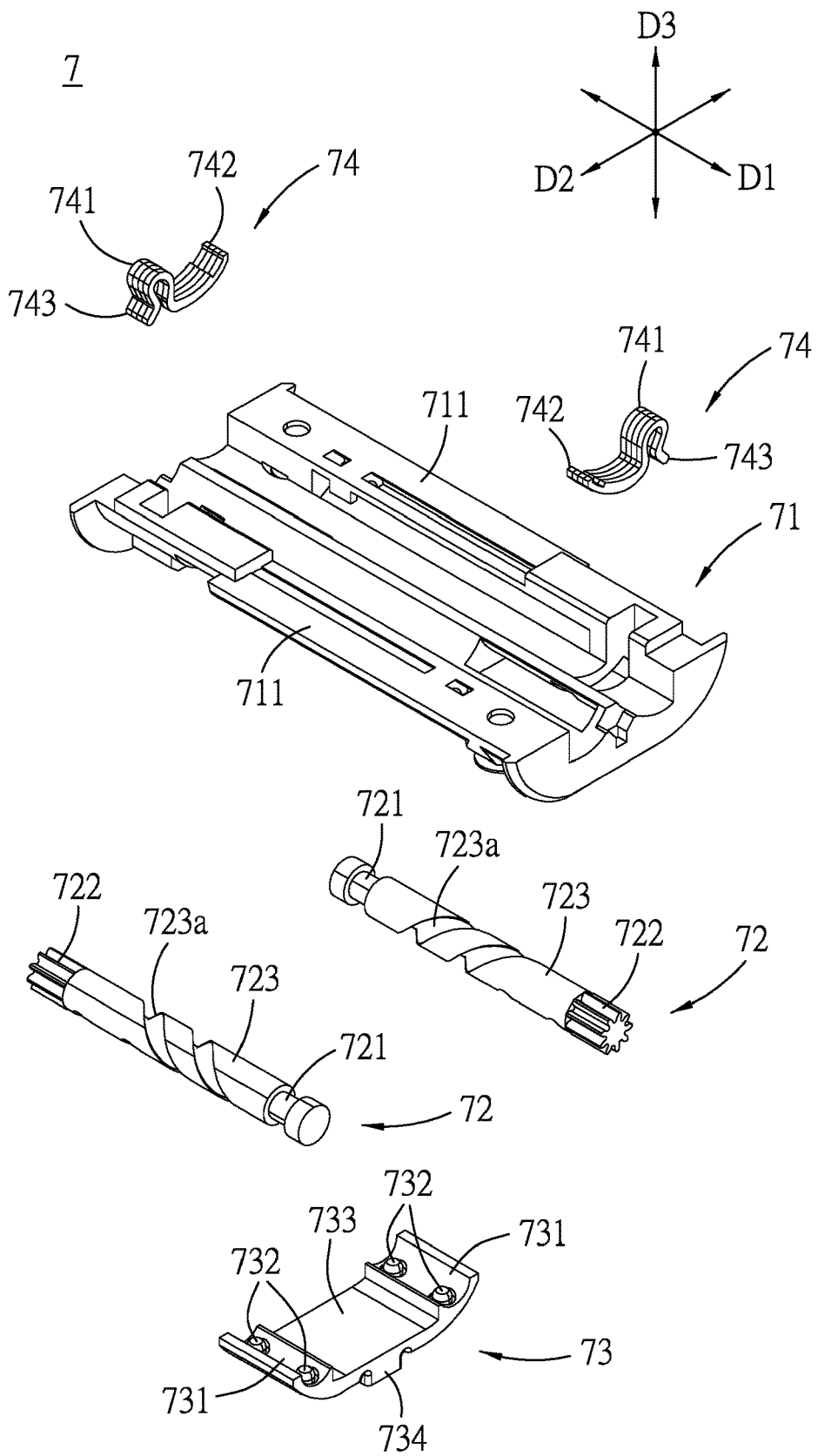
FIG. 13 is an exploded perspective view of the hinge mechanism.
Figure 14:
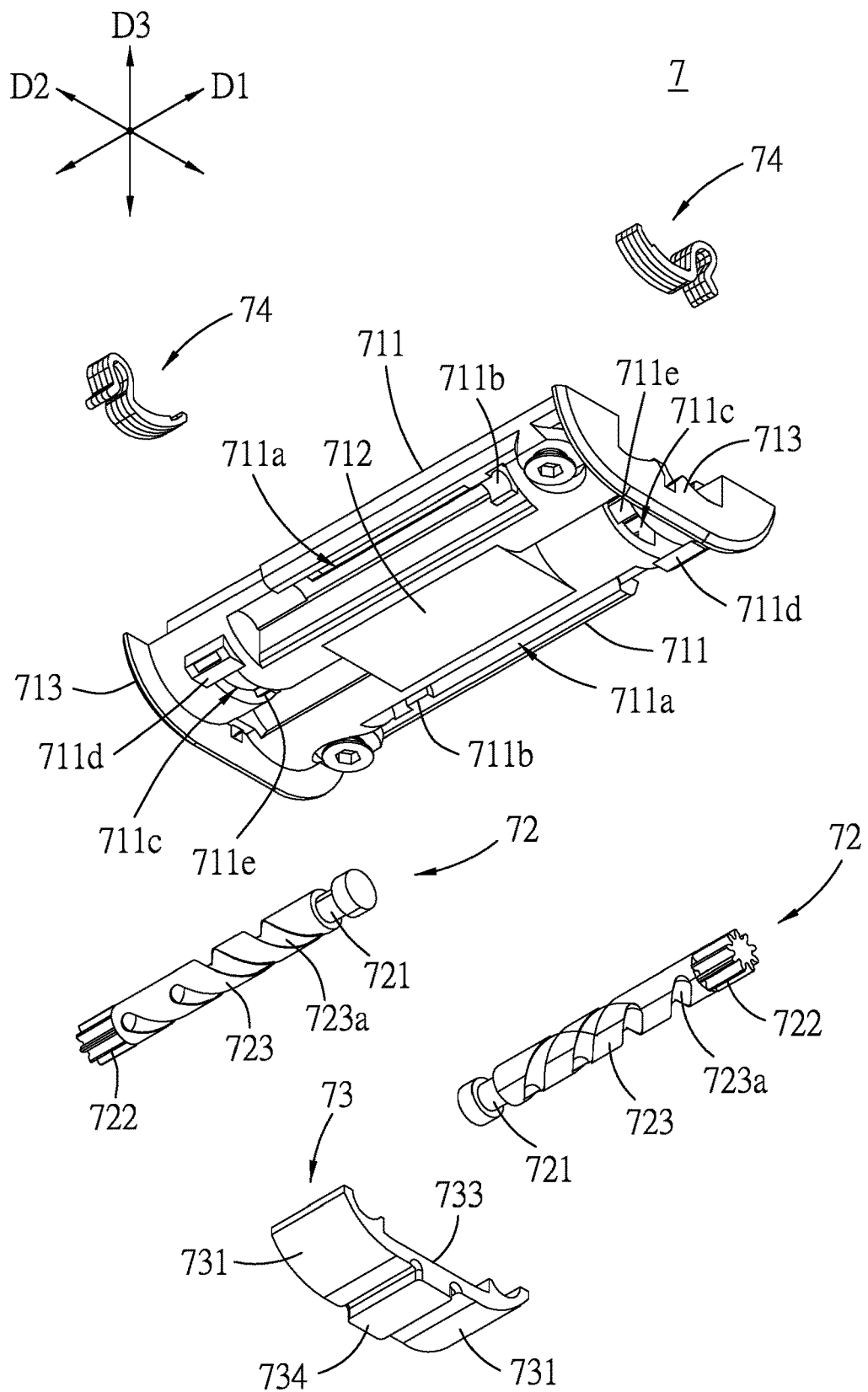
FIG. 14 is an exploded perspective view similar to FIG. 13 but taken from another angle.

Referring to FIGS. 13 and 14, the torque transmitting unit 7 includes a transmitting base 71, two transmitting shafts 72, a synchronously driving member 73 and two torque retaining members 74. The transmitting base 71 is disposed over the base frame 5 and the rotary members 6, and is secured to the second bottom walls 55 of the base frame 5 by means of two fasteners (not shown). The transmitting base 71 has two mounting portions 711 each of which extends in the left-right direction (D1) and which are disposed opposite to each other in the front-rear direction (D2), a flat wall portion 712 which is formed between and flush with the lower walls of the mounting portions 711, and two wing plates 713 which are disposed at left and right ends of the mounting portions 711, respectively. Each of the mounting portions 711 is in the form of a semi cylinder, and has a shaft accommodating groove (711a) which is formed in a lower wall thereof and opened downwardly, and which is elongated in the left-right direction (D1). Each mounting portion 711 also has an anchoring protrusion (711b) which is disposed in and projects from one end of the shaft accommodating groove (711a), a penetrating region (711c) which is formed at the other end opposite to the anchoring protrusion (711b) and extends therethrough in the up-down direction (D3), a crosspiece (711d) which extends across the penetrating region (711c) in the left-right direction (D1), and an engaging protrusion (711e) which is formed at an end of the penetrating region (711c) away from the crosspiece (711d). In this embodiment, the anchoring protrusion (711b) is in the form of an anchoring half matched with the corresponding anchoring half 57 of the base seat 5 (see FIG. 9) in the up-down direction (D3). The transmitting shafts 72 are respectively disposed in the shaft accommodating grooves (711a) of the mounting portions 711. Each of the transmitting shafts 72 has a pivot end 721 which is pivotably engaged with the anchoring protrusion (711b) and the anchoring half 57 to permit rotation of the transmitting shaft 72 relative to the transmitting base 71, a toothed end 722 opposite to the pivot end 721 in the left-right direction (D1), and a middle spirally grooved portion 723 which is interposed between the pivot and toothed ends 721, 722 and formed with a spiral groove (723a). As shown in FIGS. 11 and 12, the arcuate rack portions 613 of the rotary members 6 are respectively sleeved on and mesh with the toothed ends 722 of the transmitting shafts 72 to allow the rotation of the transmitting shafts 72 when the arcuate rack portions 613 are pivoted about the transmitting shafts 72. In this embodiment, the pivot ends 721 of the transmitting shafts 72 are disposed opposite to each other in the left-right direction (D1), and the toothed ends 722 of the transmitting shafts 72 are disposed opposite to each other in the left-right direction (D1).

Figure 15:
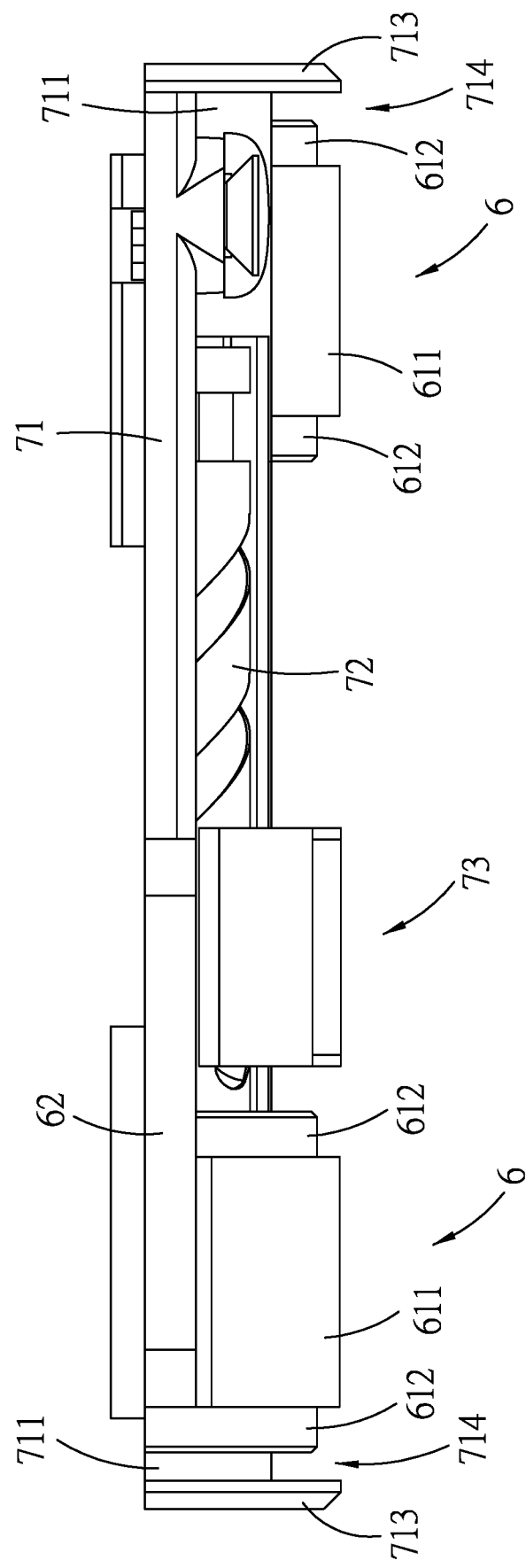
FIG. 15 is a schematic side view of the hinge mechanism.

Referring again to FIGS. 11 to 14, the synchronously driving member 73 is disposed at the rail region 51, and has two arcuate engaging portions 731 which are respectively engaged with the spirally grooved portions 723 of the transmitting shafts 72 and which respectively have engaging protrusions 732 that are respectively and fittingly engaged in and movable along the spiral grooves (723a) to allow the rotation of the transmitting shafts 72 relative to the synchronously driving member 73, and a transiting portion 733 which is interposed between the arcuate engaging portions 731 and which is movably disposed at the rail region 51 in the left-right direction (D1) so as to make synchronous rotations of the transmitting shafts 72 in opposite rotational directions. In this embodiment, two of the engaging protrusions 732 are disposed on each arcuate engaging portion 731. The transiting portion 733 is interposed between the flat wall portion 712 of the transmitting base 71 and the first bottom wall 53 of the base seat 5 in the up-down direction (D3), and has a guided protrusion 734 formed at a lower side thereof and slidably engaged in the grooved rail 531 to allow stable and smooth movement of the synchronously driving member 73 along the grooved rail 531 to make the synchronous rotations of the transmitting shafts 72 in the opposite rotational directions. The transiting portion 733 has an upper wall portion which is opposite to the guided protrusion 734 in the up-down direction (D3) and which is slidably attached to the flat wall portion 712. Thus, the transiting portion 733 is made attached to the flat wall portion 712 and the first bottom wall 53 so as to minimize the height of the synchronously driving member 73 in the up-down direction (D3) and reduce the entire height of the hinge mechanism 4. Also, the arcuate plate mounting portion 61 of each rotary member 6 is matchingly sleeved on the corresponding mounting portion 711 of the transmitting base 71 so as to minimize the thickness of the hinge mechanism 4. As shown in FIG. 15, the rotary member 6 is spaced apart from the corresponding wing plate 713 by a gap 714 for insertion of the corresponding second rib 56 of the base seat 5, which can be retainingly engaged with the corresponding mounting portion 711. Thus, the entire thickness of the hinge mechanism 4 is reduced and the structure of the hinge mechanism 4 is enhanced.

Referring again to FIGS. 11 to 14, each of the torque retaining members 74 is disposed in the corresponding penetrating region (711c) of the transmitting base 71 and at the arcuate concaved portion 614 of the corresponding rotary member 6. In this embodiment, each torque retaining member 74 is composed of a plurality of stacked leaf springs, and has a middle bending portion 741 which is disposed on the crosspiece (711d), a fixed end 742 which abuts against the engaging protrusion (711e) to be fixed thereon, and a retaining end 743 which extends through the penetrating region (711c) to be retainingly engaged with one of the first and second retaining ends (614a, 614b).

Figure 16:
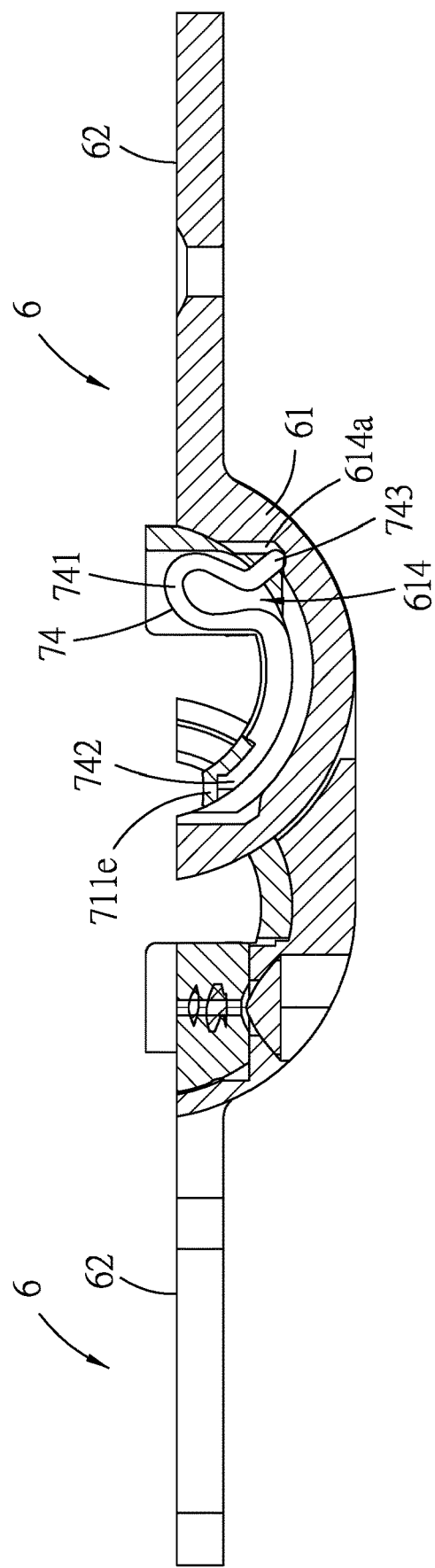
FIG. 16 is a sectional view taken along line XVI-XVI of FIG. 7.

Referring to FIGS. 6 to 8 and FIGS. 16 to 20, specifically, the rotary members 6 are rotatable relative to the base seat 5 by at least 90 degrees between an unfolded position (see FIGS. 6 to 8 and FIG. 16), where the plate connecting portions 62 extend parallel to each other and lie on a horizontal plane to place the housing shells 1 in a horizontal unfolded state, and a folded position (see FIGS. 17 to 20), where the plate connecting portions are placed close to each other. In the unfolded position, the synchronously driving member 73 is moved closer to one of the rotary members 6 (e.g., the left rotary member 6 as shown in FIG. 10), the guided protrusion 734 of the synchronously driving member 73 is moved to the first rail end (531a) as shown in FIG. 8, and the retaining ends 743 of the torque retaining members 74 abut against and are retainingly engaged with the first retaining ends (614a) of the arcuate concaved portions 614 of the rotary members 6, as shown in FIG. 16, to retain the rotary members 6 in the unfolded position and to keep the housing shells 1 in the horizontal unfolded state.

Figure 17:
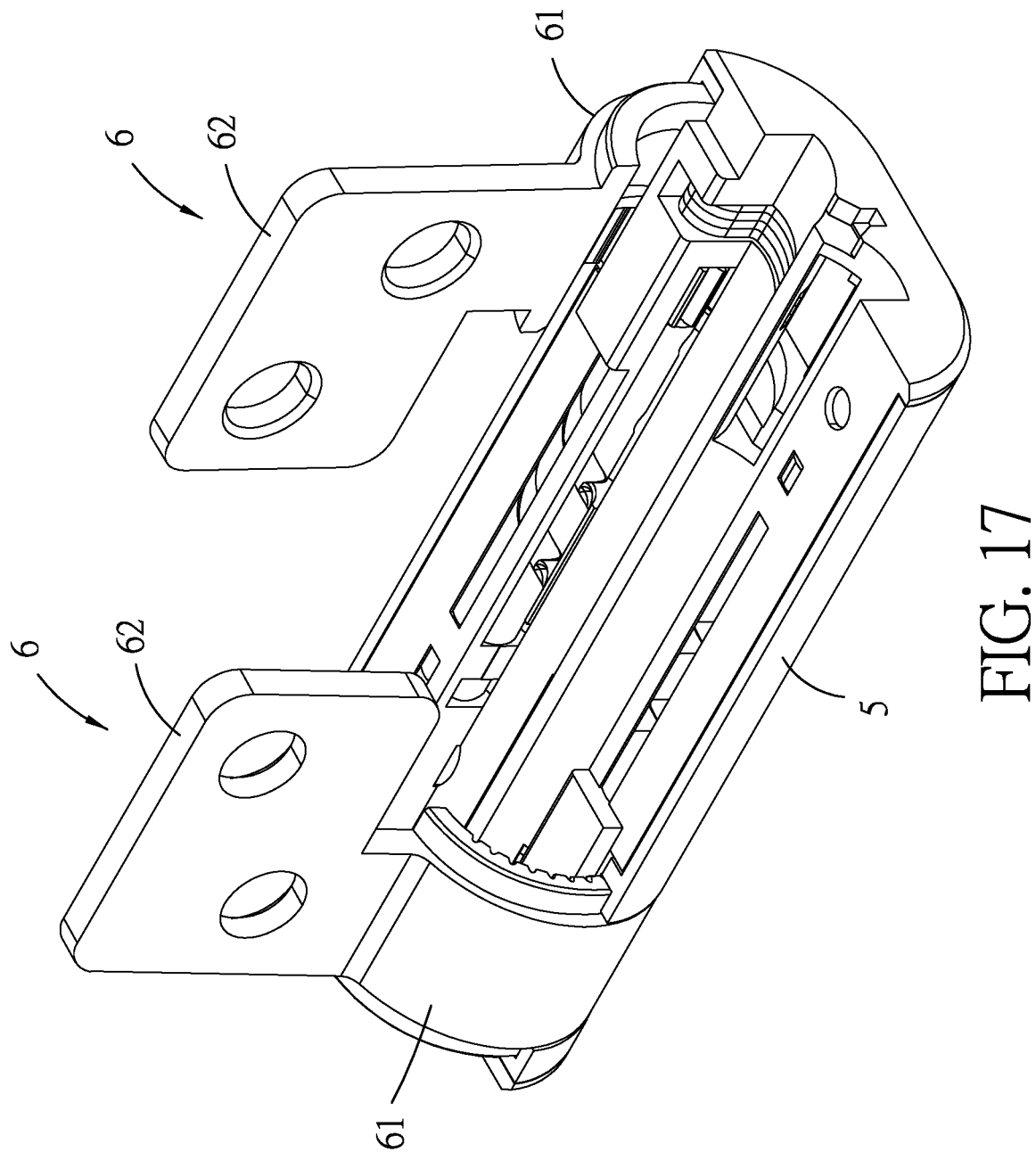
FIG. 17 is a perspective view of the hinge mechanism, the rotary members of which are in a folded position.
Figure 18:
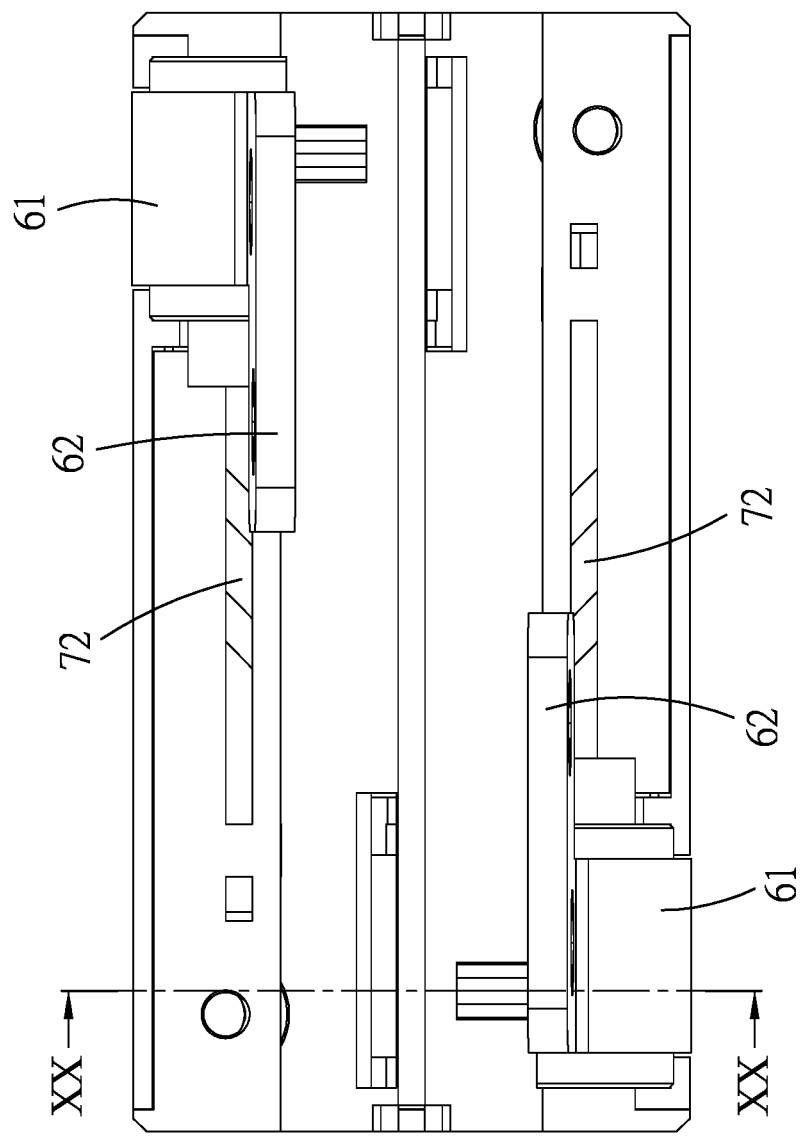
FIG. 18 is a top view of FIG. 17.
Figure 19:
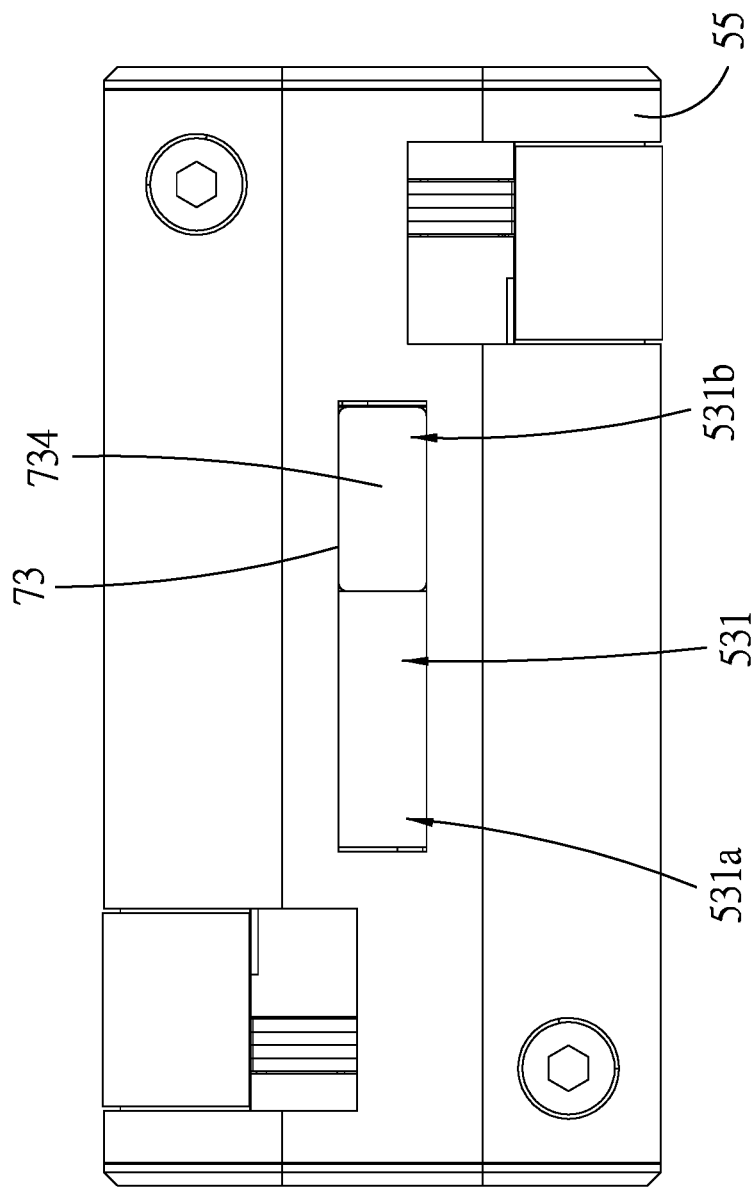
FIG. 19 is a bottom view of FIG. 17.
Figure 20:
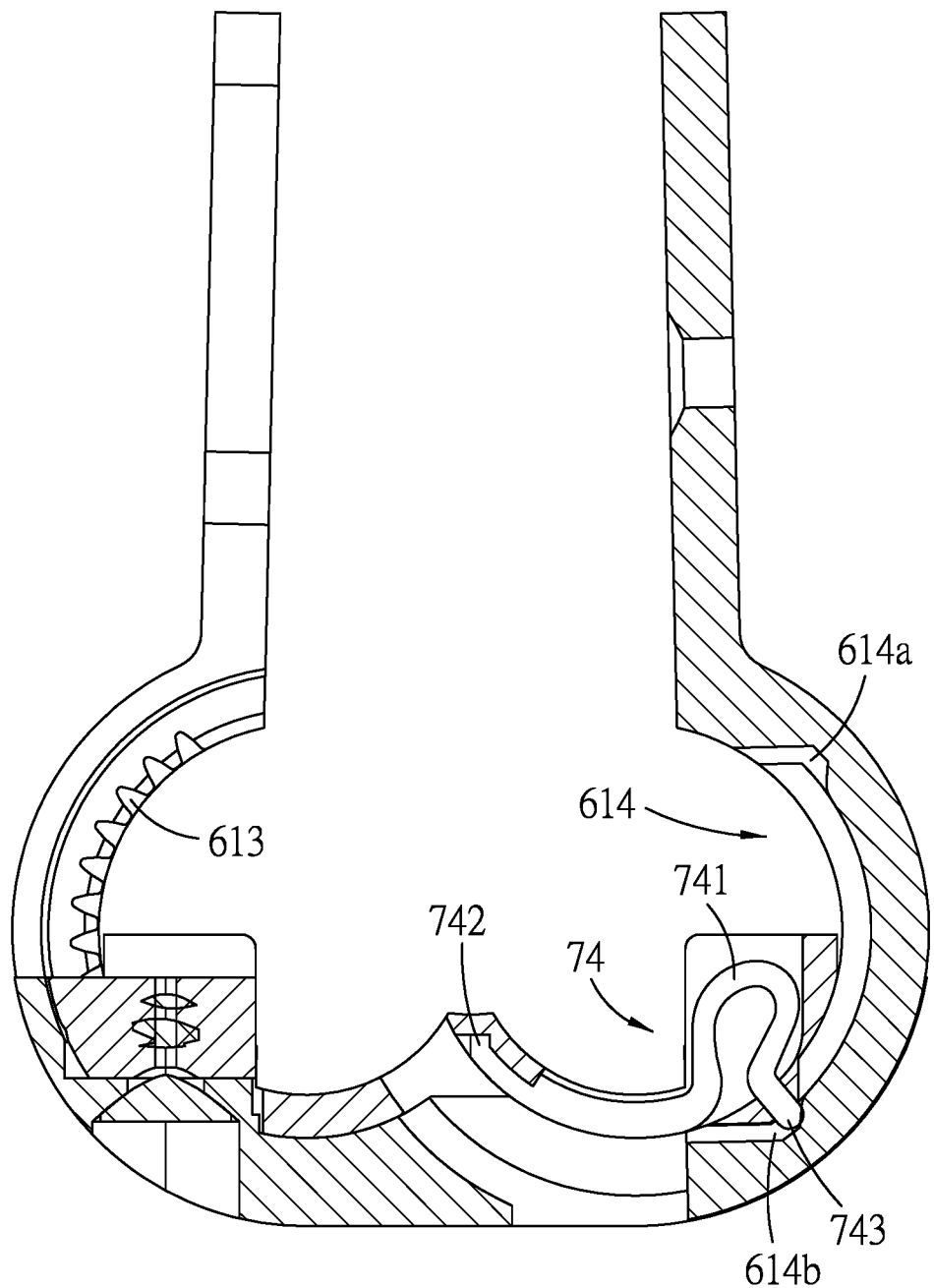
FIG. 20 is a sectional view taken along line XX-XX of FIG. 18.

Referring to FIGS. 1, 17 to 20, when it is desired to fold the flexible display, a manual torque is applied to the housing shells 1 in the folded directions (B1) to overcome a biasing force of the torque retaining members 74 to the first retaining ends (614a). The arcuate plate mounting portions 61 of the rotary members 6 are respectively pivoted about the transmitting shafts 72 relative to the second bottom walls 55. During the pivoting, with the arcuate rack portions 613 meshing with the toothed ends 722 of the transmitting shafts 72 (see FIG. 12), and with the synchronously driving member 73, the transmitting shafts 72 are synchronously rotated in opposite rotational directions. Meanwhile, the guided protrusion 734 of the synchronously driving member 73 is moved along the grooved rail 531 toward the second rail end (531b) such that the plate connecting portion 62 is turned inwardly for at least 90 degrees to the folded position, as shown in FIGS. 17 to 19, where the guided protrusion 734 reaches the second rail end (531*b*) so as to place the housing shells 1 in an upright folded state. In this embodiment, the turning angle of the rotary members 6 and the housing shells 1 is greater than 90 degrees. The retaining ends 743 of the torque retaining members 74 abut against and are retainingly engaged with the second retaining ends (614*b*) of the arcuate concaved portions 614 of the rotary members 6, as shown in FIG. 20, to retain the rotary members 6 in the folded position and to keep the housing shells 1 in the upright folded state.

Referring to FIGS. 6 to 8, in this embodiment, the upper and lower halves of each hinge mechanism 4 are symmetrical in terms of the rotary center (P). As such, both the rotary members 6 of each hinge mechanism 4 can have the same configuration so as to reduce manufacturing and mold design costs. Moreover, since the rotary members 6 of the hinge mechanisms 4 are alternately arranged along a zip-zag line, as shown in FIG. 4, the structural connection between the housing shells 1 and the hinge mechanisms 4 can be more stabilized and enhanced.

Alternatively, the mounting regions 52 of the base seat 5 may be formed at the same side of the rail region 51 (i.e., the left or right side of the rail region 51).

As illustrated, with the arcuate second bottom walls 55 of the base seat 5 for allowing the arcuate plate mounting portions 61 of the rotary members 6 to be rotated about the transmitting shafts 72 on the arcuate second bottom walls 55, the hinge mechanism 4 is rotatable smoothly. Moreover, with the synchronously driving member 73 making the synchronous rotations of the transmitting shafts 72, the hinge mechanism 4 is rotatable stably to reduce the risk to damage the flexible display during folding and unfolding of the same.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge mechanism connectable with two housing shells for a flexible display to be attached thereto, comprising:
    a base seat having a first bottom wall which extends in a left-right direction to terminate at two first wall ends, two first ribs which respectively extend from said first wall ends in an up-down direction so as to cooperatively define a rail region thereamong, two arcuate second bottom walls which respectively extend from said first wall ends in the left-right direction to respectively terminate at two second wall ends, and two second ribs which respectively extend from said second wall ends in the up-down direction, each of said second bottom walls having an upper wall surface which is curved and which cooperates with adjacent ones of said first and second ribs to define a mounting region thereamong;
    a torque transmitting unit including
        a transmitting base disposed over said base seat, and having two mounting portions each of which extends in the left-right direction and which are disposed opposite to each other in a front-rear direction, each of said mounting portions having a shaft accommodating groove which is formed in a lower wall thereof and opened downwardly, and which is elongated in the left-right direction, and an anchoring protrusion which is disposed in and projects from one end of said shaft accommodating groove,
        two transmitting shafts respectively disposed in said shaft accommodating grooves of said mounting portions, each of said transmitting shafts having a pivot end which is pivotably engaged with said anchoring protrusion to permit rotation of said transmitting shaft relative to said transmitting base, a toothed end opposite to said pivot end in the left-right direction, and a middle spirally grooved portion which is interposed between said pivot and toothed ends and formed with a spiral groove, and
        a synchronously driving member disposed at said rail region, and having two arcuate engaging portions which are respectively engaged with said spirally grooved portions of said transmitting shafts and which respectively have engaging protrusions that are respectively and fittingly engaged in and movable along said spiral grooves to allow rotation of said transmitting shafts relative to said synchronously driving member, and a transiting portion which is interposed between said arcuate engaging portions and which is movably disposed at said rail region in the left-right direction so as to make synchronous rotations of said transmitting shafts in opposite rotational directions; and
    two rotary members respectively disposed at said mounting regions, each of said rotary members having an arcuate rack portion which is sleeved on and meshes with said toothed end of said respective transmitting shaft to allow the rotation of said transmitting shaft when said arcuate rack portion is pivoted about said transmitting shaft, and a plate connecting portion which extends laterally and in the front-rear direction from said arcuate rack portion and which is connectable with a respective one of the housing shells such that said rotary members are rotatable relative to said base seat by at least 90 degrees between an unfolded position, where said plate connecting portions extend parallel to each other and lie on a horizontal plane, and a folded position, where said plate connecting portions are placed close to each other.

2. The hinge mechanism as claimed in claim 1, wherein said pivot ends of said transmitting shafts are disposed opposite to each other in the left-right direction, and said toothed ends of said transmitting shafts are disposed opposite to each other in the left-right direction, said upper wall surface of each of said second bottom walls having two arcuate supporting surface portions which are spaced apart from each other in the left-right direction by a notched slot that extends through said second bottom wall, each of said rotary members having two arcuate sliding wall portions which are respectively and fittingly slidable on said arcuate supporting surface portions to make the pivoting of said arcuate rack portion about said transmitting shaft relative to said base seat, and an arcuate cover wall portion which interconnects said arcuate sliding wall portions to cover said notched slot.

3. The hinge mechanism as claimed in claim 1, wherein each of said rotary members has an arcuate concaved portion adjoined to said arcuate rack portion in the left-right direction and having first and second retaining ends opposite to each other in the front-rear direction, said torque transmitting unit including two torque retaining members which are disposed on said mounting portions of said transmitting base and at said arcuate concaved portions, respectively, each of said torque retaining members having a fixed end which abuts against and is fixed to said corresponding mounting portion, and a retaining end which is retainingly engaged with said first retaining end to retain said rotary member in the unfolded position, and retainingly engaged with said second retaining end to retain said rotary member in the folded position.

4. The hinge mechanism as claimed in claim 3, wherein each of said mounting portions of said transmitting base has a penetrating region which extends therethrough in the up-down direction, a crosspiece which extends across said penetrating region in the left-right direction, and an engaging protrusion which is formed at an end of said penetrating region, each of said torque retaining members being disposed in said corresponding penetrating region and having a middle bending portion which is disposed on said crosspiece, said fixed end which abuts against said engaging protrusion, and said retaining end which extends through said penetrating region to be engaged with one of said first and second retaining ends.

5. The hinge mechanism as claimed in claim 1, wherein said first bottom wall of said base seat has a grooved rail formed at said rail region and extending in the left-right direction, said transiting portion of said synchronously driving member having a guided protrusion formed at a lower side thereof and slidably engaged in said grooved rail to allow movement of said synchronously driving member along said grooved rail to make the synchronous rotations of said transmitting shafts in the opposite rotational directions.

6. The hinge mechanism as claimed in claim 5, wherein said transmitting base has a flat wall portion formed between and flush with said lower walls of said mounting portions, said transiting portion of said synchronously driving member having an upper wall portion which is opposite to said guided protrusion in the up-down direction and which is slidably attached to said flat wall portion.

7. The hinge mechanism as claimed in claim 1, wherein said hinge mechanism has a rotary center at a center thereof, and a central line which extends in the left-right direction and passes through the rotary center to define upper and lower halves of said hinge mechanism, said upper and lower halves being symmetrical in terms of the rotary center.

8. A foldable display device for a flexible display to be attached thereto, comprising:
   two housing shells, each including a shell body and a supporting plate which covers said shell body, said supporting plates of said housing shells cooperatively defining a support surface for the flexible display to be attached thereto; and
   a plurality of hinge mechanisms as claimed in claim 1, and disposed and spaced apart from each other in the left-right direction, said plate connecting portions of said rotary members of each of said hinge mechanisms being respectively connected with said supporting plates of said housing shells.

9. The foldable display device as claimed in claim 8, further comprising a cover shell extending in the left-right direction for supporting said hinge mechanisms thereon, and a plurality of connecting bars each interconnecting two adjacent ones of said hinge mechanisms and secured to said cover shell.

10. The foldable display device as claimed in claim 8, wherein each of said hinge mechanisms has a rotary center at a center thereof, and a central line which extends in the left-right direction and passes through the rotary center to define upper and lower halves of a corresponding one of said hinge mechanisms, said upper and lower halves being symmetrical in terms of the rotary center.

* * * * *